(12) United States Patent
Kyono et al.

(10) Patent No.: US 12,361,585 B2
(45) Date of Patent: Jul. 15, 2025

(54) FEATURE DETECTION FOR AUTOMATED AIR-TO-AIR REFUELING (A3R)

(71) Applicant: The Boeing Company, Chicago, IL (US)

(72) Inventors: Trent M. Kyono, Wailuku, HI (US); Jacob Arthur Lucas, Makawao, HI (US); Nicole Catherine Gagnier, Kihei, HI (US); Justin Cleve Hatcher, Sumner, WA (US); James L. Clayton, Meridian, ID (US); Yifan Yang, Kirkland, WA (US); Paul S. Idell, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 393 days.

(21) Appl. No.: 17/574,498

(22) Filed: Jan. 12, 2022

(65) Prior Publication Data
US 2022/0258875 A1 Aug. 18, 2022

Related U.S. Application Data

(60) Provisional application No. 63/149,606, filed on Feb. 15, 2021.

(51) Int. Cl.
*G06T 7/73* (2017.01)
*G06V 10/00* (2022.01)
(Continued)

(52) U.S. Cl.
CPC ............... *G06T 7/73* (2017.01); *G06V 10/00* (2022.01); *B64U 10/25* (2023.01); *B64U 80/25* (2023.01);
(Continued)

(58) Field of Classification Search
None
See application file for complete search history.

(56) References Cited

U.S. PATENT DOCUMENTS

2019/0344902 A1* 11/2019 Cramblitt ................ G06T 17/20
2020/0242800 A1* 7/2020 Chen .................... G06V 40/171

OTHER PUBLICATIONS

Mammarella et al., "Machine Vision/GPS Integration Using EKF for the UAV Aerial Refueling Problem," IEEE Transactions on Systems, Man, and Cybernetics—Part C: Applications and Reviews, vol. 38, No. 6, pp. 791-801 (Year: 2008).*

(Continued)

*Primary Examiner* — Vincent Rudolph
*Assistant Examiner* — Nicholas Crespo Stazer
(74) *Attorney, Agent, or Firm* — Harrity & Harrity, LLP

(57) ABSTRACT

Aspects of the disclosure provide solutions for automated air-to-air refueling (A3R) and assisted air-to-air refueling. Examples include: receiving a video frame; generating, from the video frame, a plurality of images having differing decreasing resolutions; detecting, within each of the plurality of images, a set of aircraft keypoints for an aircraft to be refueled; merging the sets of aircraft keypoints into a set of merged aircraft keypoints; based on at least the merged aircraft keypoints, determining a position of a fuel receptacle on the aircraft; and determining a position of a boom tip of an aerial refueling boom. Some examples include, based on at least the position of the fuel receptacle and the position of the boom tip, controlling the aerial refueling boom to engage the fuel receptacle, and for some examples, the video frame is monocular (e.g., provided by a single camera).

20 Claims, 14 Drawing Sheets

(51) Int. Cl.
  *B64U 10/25* (2023.01)
  *B64U 80/25* (2023.01)
(52) U.S. Cl.
  CPC .............. *G06T 2207/10016* (2013.01); *G06T 2207/20016* (2013.01); *G06T 2207/20081* (2013.01); *G06T 2207/20084* (2013.01)

(56) References Cited

OTHER PUBLICATIONS

Tompson et al., "Real-Time Continuous Pose Recovery of Human Hands Using Convolutional Networks," ACM Transactions on Graphics, vol. 33, No. 5, Article 169 (Year: 2014).*
Yin et al., "Robust Visual Detection-Learning-Tracking Framework for Autonomous Aerial Refueling of UAVs," IEEE Transactions on Instrumentation and Measurement, vol. 65, No. 3, pp. 510-521 (Year: 2016).*
Wang et al., "Towards docking safety analysis for unmanned aerial vehicle probe-drogue autonomous aerial refueling based on docking success-probability and docking reachability," Proc IMechE Part G: J Aerospace Engineering, vol. 2033(11), pp. 3893-3905 (Year: 2019).*
Lee et al., "Long-Range Pose Estimation for Aerial Refueling Approaches Using Deep Neural Networks," Journal of Aerospace Information Systems, vol. 17, No. 11, pp. 634-646 (Year: 2020).*
Sun et al., "Robust Landmark Detection and Position Measurement Based on Monocular Vision for Autonomous Aerial Refueling of UAVs," IEEE Transactions on Cybernetics, vol. 49, No. 12, pp. 4167-4179 (Year: 2019).*

* cited by examiner

FEATURE DETECTION FOR AUTOMATED AIR-TO-AIR REFUELING (A3R)

CROSS-REFERENCE TO RELATED APPLICATION

This application claims the benefit of and priority to U.S. Provisional Application No. 63/149,606, entitled "FEATURE DETECTION FOR AUTOMATED AIR-TO-AIR REFUELING (A3R)", filed Feb. 15, 2021, which is incorporated by reference herein in its entirety.

BACKGROUND

Aerial refueling (air-to-air refueling) is typically performed manually, by a highly-skilled human refueling boom operator. Some arrangements place the human operator behind a window, with a view of the refueling boom and the aircraft to be refueled. This type of arrangement requires the added significant expense of providing accommodation for the human operator in the rear of the refueling platform.

Some arrangements use stereoscopic vision with dual cameras, in which the human operator wears goggles that provide a three-dimensional (3D) view based on the views from the dual cameras. Some other arrangements use light detection and ranging (LIDAR) or radar to provide supplemental range measurements for the human operator. These latter types of arrangements require additional expensive components.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Aspects of the disclosure provide solutions for automated air-to-air refueling (A3R) and assisted air-to-air refueling. Examples include: receiving a video frame; generating, from the video frame, a plurality of images having differing decreasing resolutions; detecting, within each of the plurality of images, a set of aircraft keypoints for an aircraft to be refueled; merging the sets of aircraft keypoints into a set of merged aircraft keypoints; based on at least the merged aircraft keypoints, determining a position of a fuel receptacle on the aircraft; and determining a position of a boom tip of an aerial refueling boom. Some examples include, based on at least the position of the fuel receptacle and the position of the boom tip, controlling the aerial refueling boom to engage the fuel receptacle, and for some examples, the video frame is monocular (e.g., provided by a single camera).

BRIEF DESCRIPTION OF THE DRAWINGS

The disclosed examples are described in detail below with reference to the accompanying drawing figures listed below.

Corresponding reference characters indicate corresponding parts throughout the drawings in accordance with an example.

DETAILED DESCRIPTION

Figure 1A:
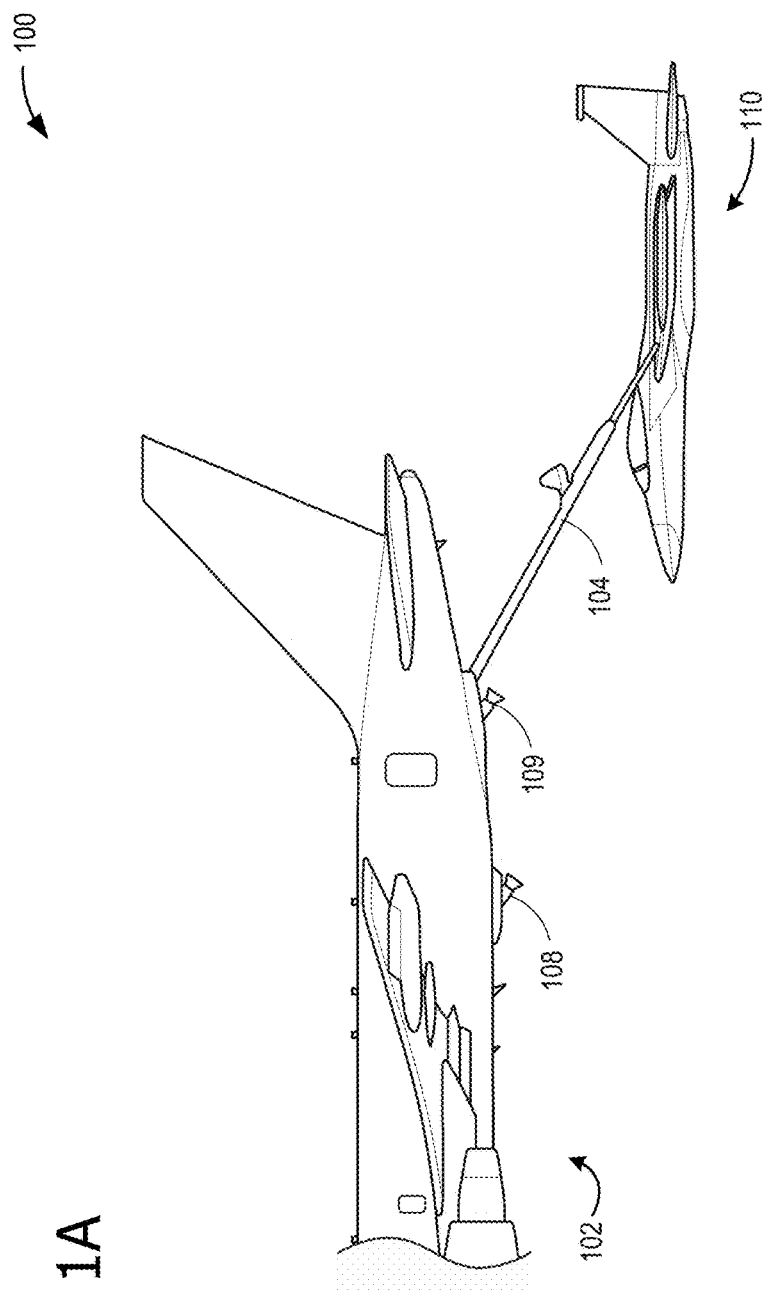
FIG. 1A illustrates an arrangement 100 that advantageously employs feature detection for automated air-to-air refueling (A3R), in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects of the disclosure provide solutions for automated air-to-air refueling (A3R) and assisted air-to-air refueling. Examples include: receiving a video frame; generating, from the video frame, a plurality of images having differing decreasing resolutions; detecting, within each of the plurality of images, a set of aircraft keypoints for an aircraft to be refueled; merging the sets of aircraft keypoints into a set of merged aircraft keypoints; based on at least the merged aircraft keypoints, determining a position of a fuel receptacle on the aircraft; and determining a position of a boom tip of an aerial refueling boom. Some examples include, based on at least the position of the fuel receptacle and the position of the boom tip, controlling the aerial refueling boom to engage the fuel receptacle, and for some examples, the video frame is monocular (e.g., provided by a single camera).

Aspects of the disclosure have a technical effect of improved operation of a computer, for example by reducing distance calculations, in image processing, to thereby reduce computation time and processing expense. Examples herein improve the efficiency of computational hardware, and provide better allocation of resources, as compared to traditional systems that rely on, for example processing many different measurement inputs.

Aspects of the disclosure are able to estimate the position of a three-dimensional object (e.g., an aircraft fuel receptacle) in a video stream collected by a single camera, such as in support of autonomous aerial refueling operations and/or human-assisted aerial refueling operations. For example, aspects of the disclosure locate the relative positions of an aircraft fuel receptacle and a refueling platform's refueling boom in order to automate control of the refueling boom during refueling. In some examples, position and pose information is represented as six degrees-of-freedom (6DoF) including the three-dimensional (3D) position (x, y, and z coordinates) and orientation (roll, pitch, and yaw).

The location occurs in stages, such as by generating a pyramid representation from a two-dimensional (2D) video frame to produce a plurality of images having differing decreasing resolutions, detecting a set of aircraft keypoints (for the aircraft to be refueled) within each of the plurality of images, merging the sets of aircraft keypoints, and determining a three-dimensional (3D) position of a fuel receptacle on the aircraft based using the merged aircraft keypoints. The detection of sets of aircraft keypoints at differing resolutions, followed by merging those results, provides for higher accuracy. Multi-stage pose estimation pipelines use real-time deep learning-based detection algorithms, for example, a neural network (NN) such as a deep convolutional neural network (CNN), which may be a residual neural network (ResNet). This provides accurate detection and tracking under adverse weather and lighting conditions which can be used for autonomous aerial (air-to-air) refueling, and/or an operator feedback loop. The use of a single camera can reduce component failures and be more easily integrated into existing systems.

Referring more particularly to the drawings, FIG. 1A illustrates an arrangement 100 that includes a refueling platform 102 and an aircraft 110 to be refueled. Each of refueling platform 102 and aircraft 110 may be an example of a flying apparatus 1101, described in further retail in relation to FIGS. 11 and 12. In the arrangement 100, the refueling platform 102 uses an aerial refueling boom 104 to refuel the aircraft 110.

A camera 108 provides a video stream 202a (shown in FIG. 2) for use in determining a positions of a boom tip 106 (shown in FIG. 1C) of the aerial refueling boom 104 and a fuel receptacle 116 (shown in FIG. 1C) of the aircraft 110. A proximity sensor 109 (e.g., a light detection and ranging (lidar) or radar) is also shown. For some examples of the arrangement 100, a computer vision (CV) architecture 200 (shown in FIG. 2) fuses proximity sensor measurements from the proximity sensor 109 with extracted features of the aircraft 110 to determining a position of the fuel receptacle 116 on the aircraft 110.

Figure 1B:
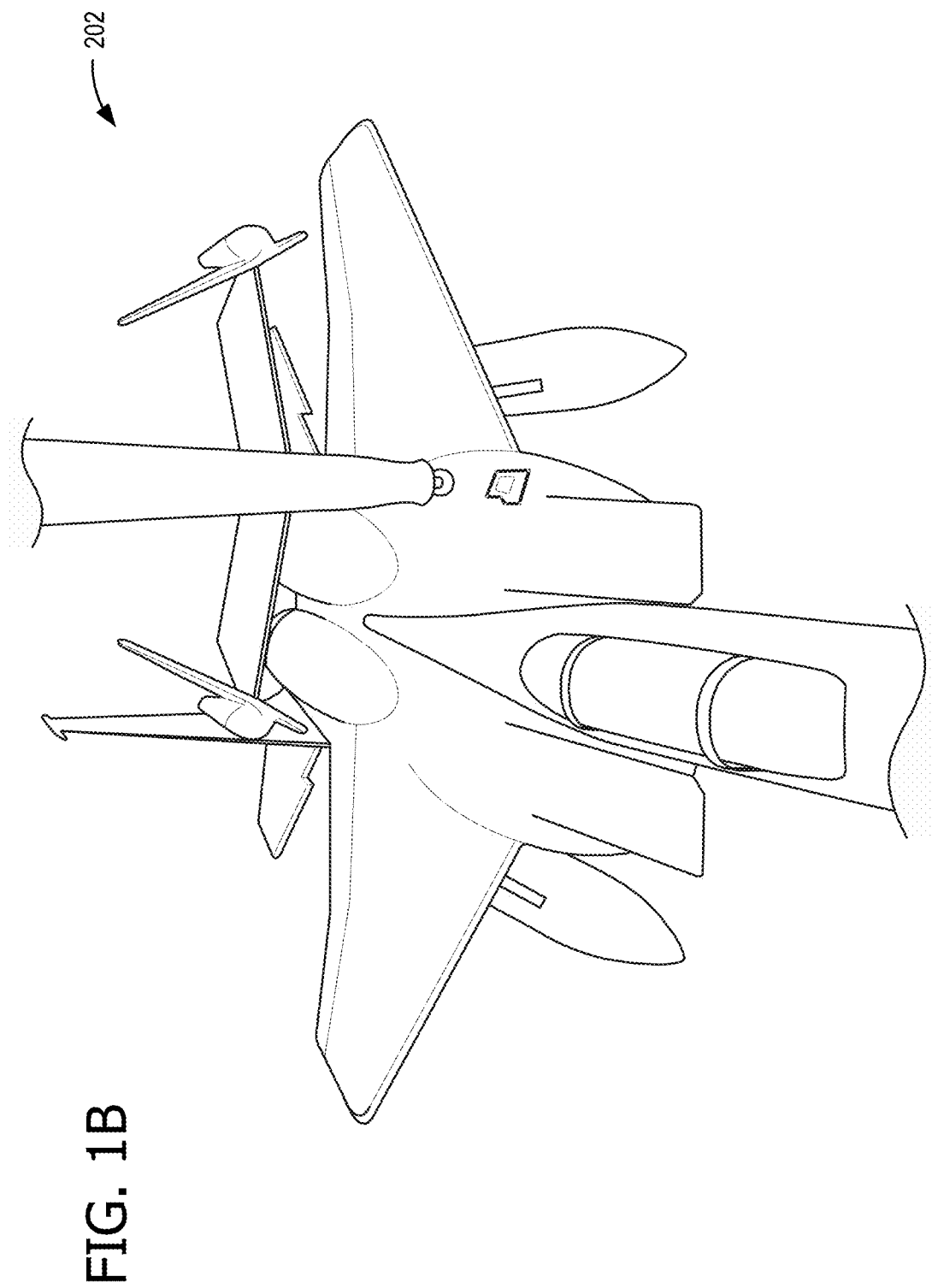
FIG. 1B illustrates a representative video frame 202 from a camera 108 in the arrangement 100, in accordance with an example.
Figure 1C:
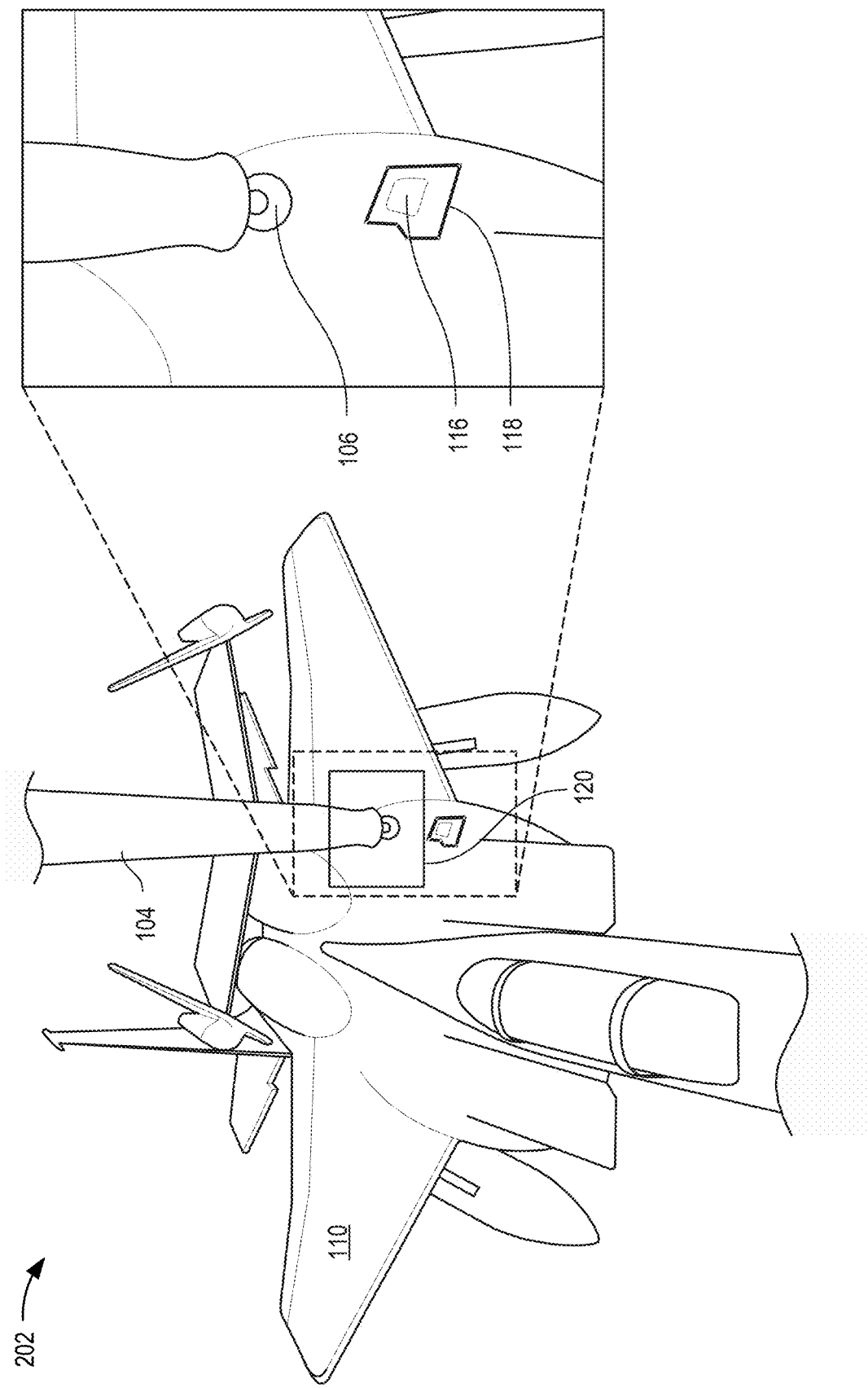
FIG. 1C provides an annotated version of FIG. 1B, identifying various elements.

FIG. 1B illustrates a representative video frame 202, which is a frame from the video stream 202a, captured by the camera 108. For clarity, FIG. 1B shows only a clean version of the video frame 202. FIG. 1C provides an annotated version of the video frame 202, identifying various elements such as the aircraft 110 and the aerial refueling boom 104. An expended view section identifies the boom tip 106, the fuel receptacle 116, and a fiducial marker 118 that outlines the fuel receptacle 116. In operation, the aerial refueling boom 104 delivers fuel to the aircraft 110 by the boom tip 106 engaging the fuel receptacle 116.

The fiducial marker 118 has a defined location relative to the fuel receptacle 116 that facilitates location of the fuel receptacle 116 on the aircraft 110. In some examples, the fiducial marker 118 may be used by elements of the CV architecture 200, specifically a CNN within an aircraft position estimation pipeline 300 (shown in FIGS. 2 and 3) as a reference aid for locating the fuel receptacle 116. The video frame 202 also shows a boom tip bounding box 120, which is used to crop the video frame 202 to the area around the boom tip 106 for image-based location of the boom tip 106. A bounding box may also be used for cropping the video frame 202 to the area around the aircraft 110 in an early stage of the aircraft position estimation pipeline 300.

Figure 2:
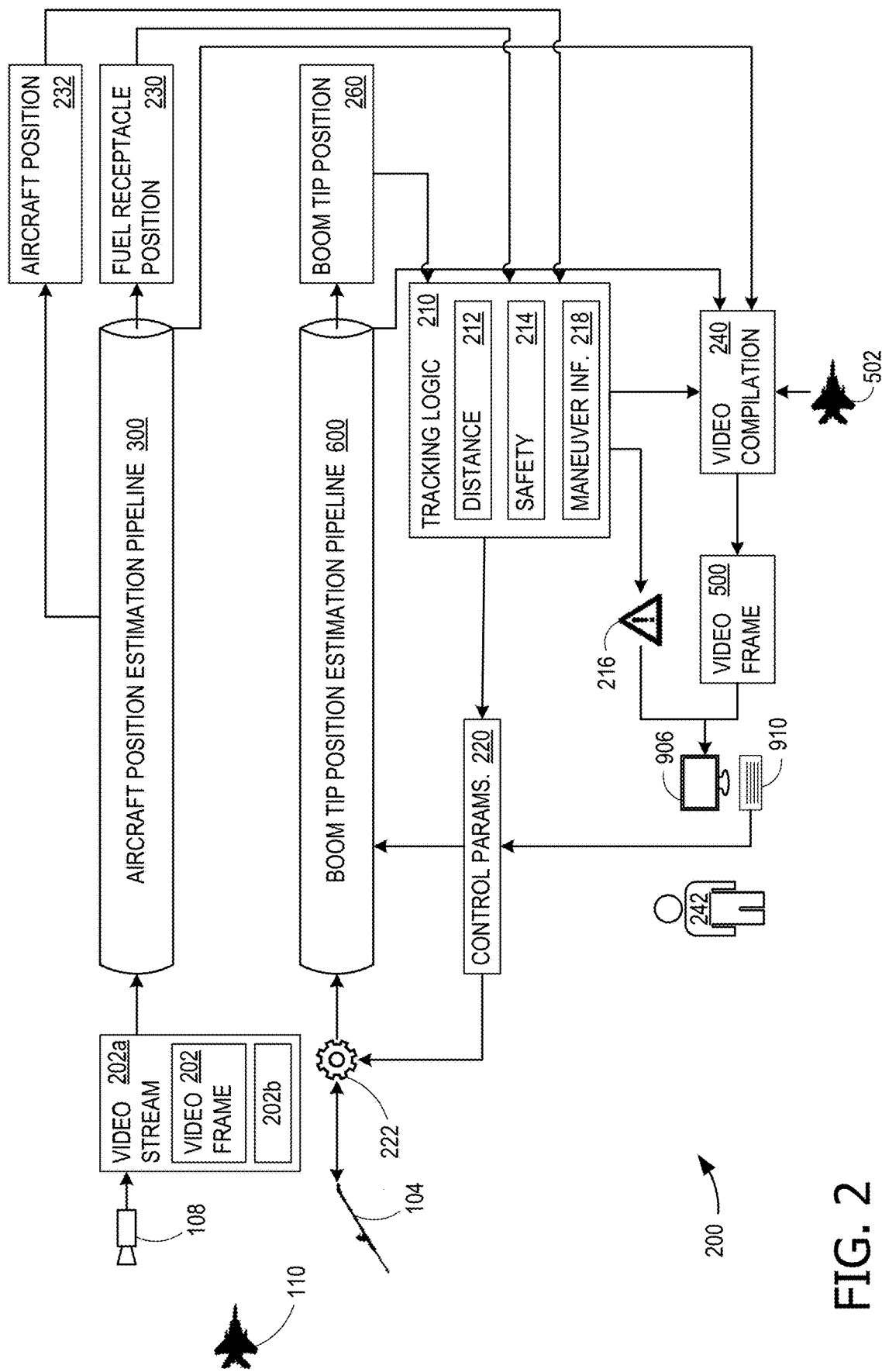
FIG. 2 illustrates a computer vision (CV) architecture 200 that may be used in the arrangement 100, in accordance with an example.

FIG. 2 illustrates the CV architecture 200 that determines a position of the fuel receptacle 116 on the aircraft 110 for the arrangement 100. Various components of the CV architecture 200 are shown with further detail in FIGS. 3, 4, and 6, and the operation of CV architecture 200 is described in further detail in relation to FIGS. 7 and 8, using flowcharts 700 and 800, respectively. In some examples, the entirety of the CV architecture 200 resides on-board the refueling platform 102. In some examples, the portions of the CV architecture 200 operate remotely, off of the refueling platform 102. The CV architecture 200 receives the video stream 202a of the aircraft 110 from the camera 108. The video stream 202a includes the video frame 202 and a plurality of additional video frames 202b. Operation of the CV architecture 200 is described in relation to processing the video frame 202. Processing of each of the plurality of additional video frames 200b is similar to that for the video frame 202.

The CV architecture 200 includes the aircraft position estimation pipeline 300 and a boom tip position estimation pipeline 600. The aircraft position estimation pipeline 300 is shown and described in further detail in relation to FIG. 3. The boom tip position estimation pipeline 600 is shown and described in further detail in relation to FIG. 6. The aircraft position estimation pipeline 300 receives the video stream 202a and outputs a fuel receptacle position 230. In some examples, the fuel receptacle position 230 is provided as 6DoF. In some examples, the aircraft position estimation pipeline 300 also outputs an aircraft position 232, which may also be provided as 6DoF. The fuel receptacle position 230 is derivable from the aircraft position 232, because the position of the fuel receptacle 116 on the aircraft 110 is fixed and known. The boom tip position estimation pipeline 600 outputs a boom tip position 260, which may be provided as 6DoF.

The fuel receptacle position 230 and the boom tip position 260 are provided to a tracking logic 210 that determines a distance 212 between the boom tip 106 and the fuel receptacle 116, which are both shown in FIG. 1C. The tracking logic 210 determines boom control parameters 220, which are provided to a boom control 222 that autonomously moves the aerial refueling boom 104 to position the boom tip 106 to engage the fuel receptacle 116. That is, boom control 222 controls the aerial refueling boom 160 to engage the fuel receptacle 116. In some examples, the tracking logic 210 also determines whether controlling the aerial refueling boom 104 to engage the fuel receptacle 116 is within safety parameters 214, and if not, generates an alert 216. In some examples, the tracking logic 210 also generates and provides, to the aircraft 110 (e.g., for a pilot or to an unmanned aerial vehicle (UAV)), maneuvering information 218 to facilitate engaging the fuel receptacle 116 with the aerial refueling boom 104 and/or to avoid an unsafe condition.

Safety parameters 214 includes a set of rules, conditions, and/or measurement values that provide boundaries for safe operation, such as to reduce risk of damage to the aircraft 110, the aerial refueling boom 104, and/or the refueling platform 102. Examples of safety parameters 214 include limits on closing rates that vary by distance (e.g., when the boom tip 106 is close to the fuel receptacle 116, the closing rate must be slower than when the boom tip 106 is further from the fuel receptacle 116), the boom tip 106 must not be closer than some minimum distance to any part of the aircraft 110 except for the fuel receptacle 116, and the angles at which the aerial refueling boom approaches the aircraft must be within some defined range. Other parameters may also be used.

Boom control parameters 220 include information (e.g., variables) that describe how the aerial refueling boom 104 may move (e.g., roll, pitch, yaw, translate, telescope, extend, retract, pivot, rotate, and the like) and may include limits and rates of such movement. The boom control parameters 220 may control the aerial refueling boom 104 given constraints of the boom pivot position and camera intrinsic and extrinsic parameters (e.g., camera parameters 664, shown in FIG. 6), for example, how to rotate the aerial refueling boom 104 (roll and pitch) and telescopically extend the aerial refueling boom 104 so that the 3D position of the boom tip 106 will be projected onto the video frame 202 where the boom tip keypoint 614 (also shown in FIG. 6) is detected.

Figure 5:
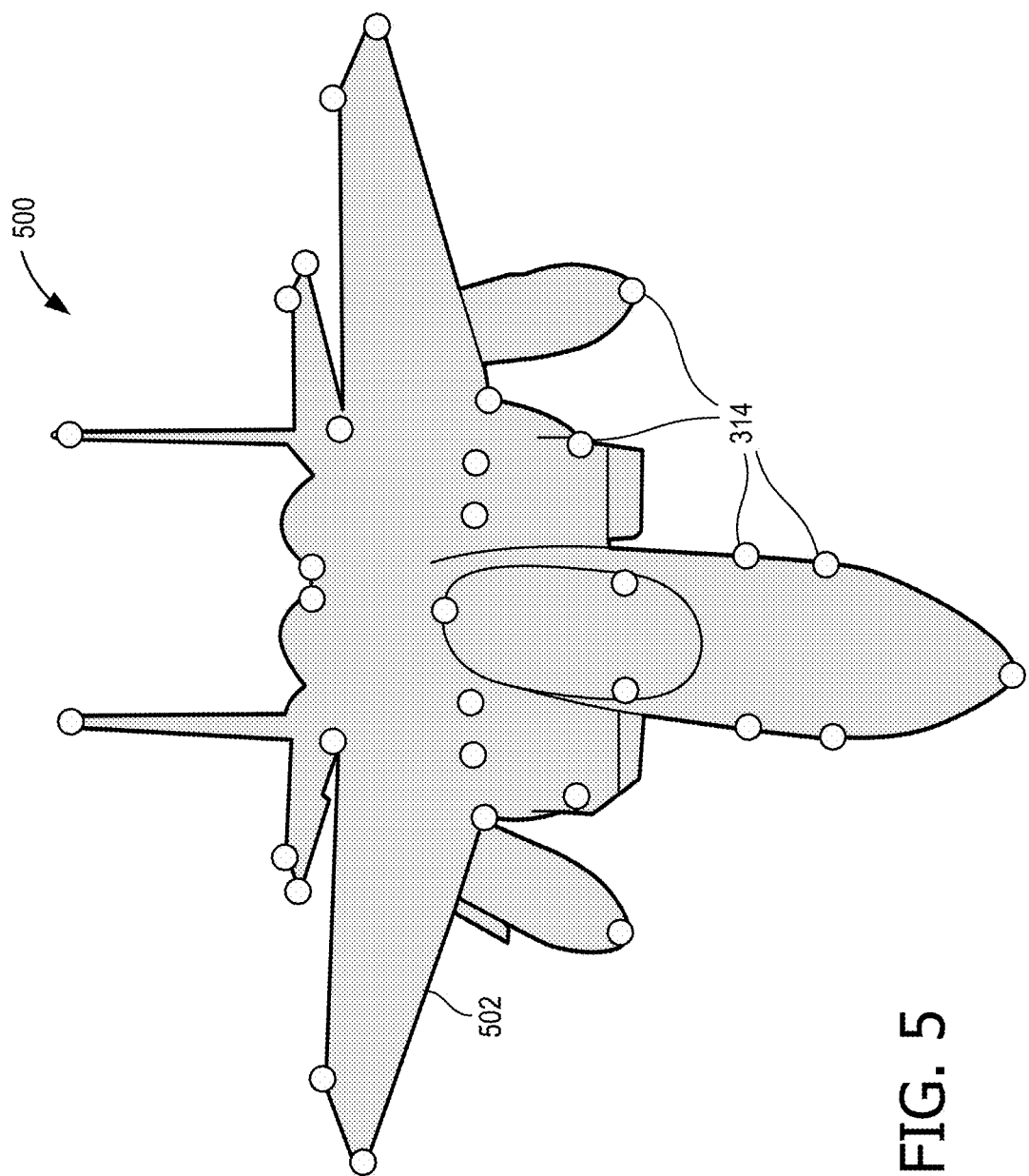
FIG. 5 illustrates a video frame 500, in which an aircraft model projection 502 is overlaid with a set of aircraft keypoints 314, in accordance with an example.

In some examples, a video compilation 240 overlays an aircraft model projection 502 and/or a boom model projection onto the video frame 202 to produce an overlaid video frame 500. An example video frame 500 is shown in FIG. 5. In some examples, the video frame 500 and/or the alert 216 are provided to a human operator 242 over presentation components 906 (e.g., by displaying the video frame 500 on a video monitor screen). In some examples, the human operator 242 uses input/output (I/O) components 910 (e.g., a joystick, mouse, keyboard, touchscreen, keypad, and/or other input devices) to provide the boom control parameters 220 to control the aerial refueling boom 104 to position the boom tip 106 to engage the fuel receptacle 116.

Figure 3:
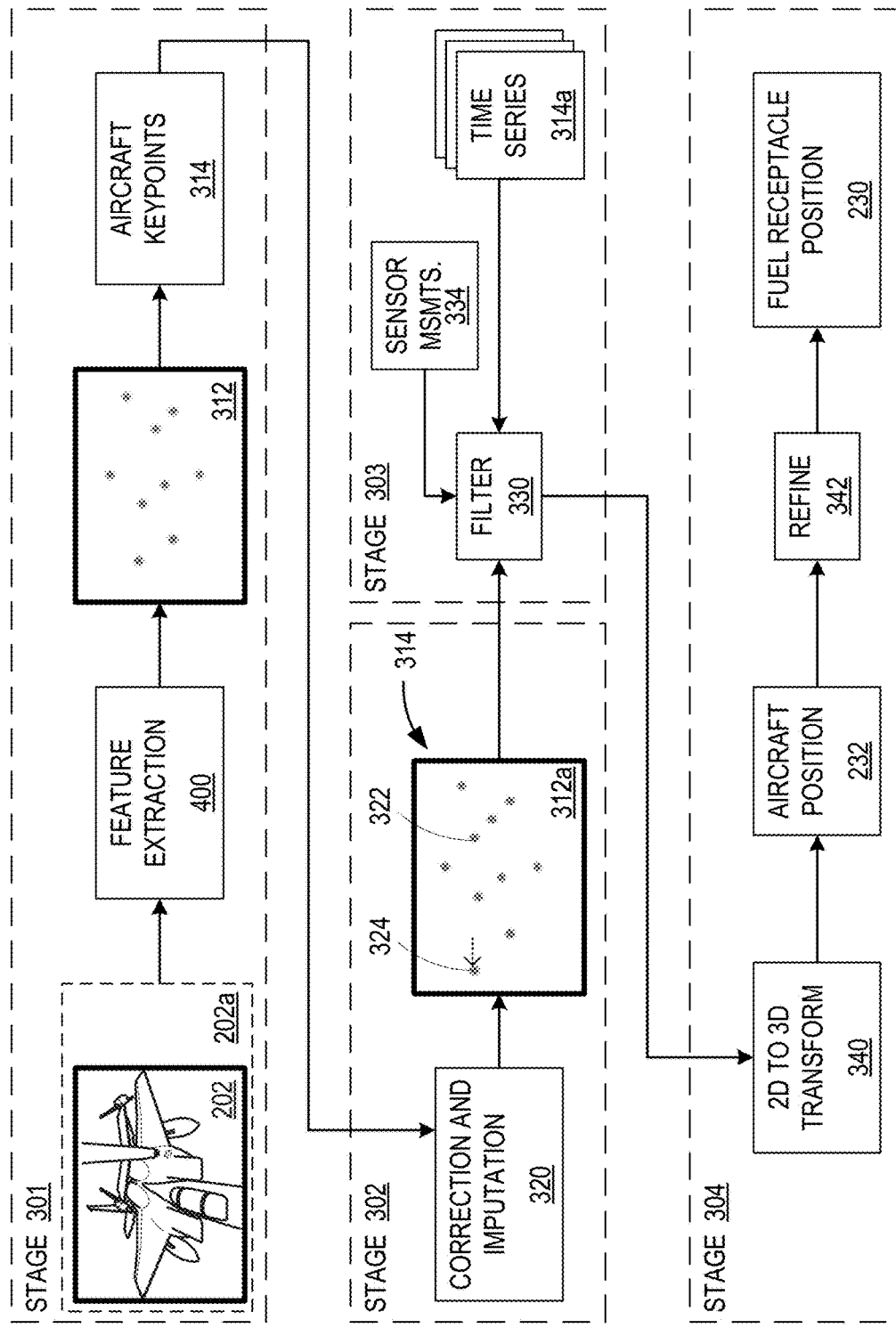
FIG. 3 illustrates a block diagram of an aircraft position estimation pipeline 300 in the CV architecture 200 of FIG. 2, in accordance with an example.

FIG. 3 illustrates further detail for the aircraft position estimation pipeline 300, showing the aircraft position estimation pipeline 300 as comprising four stages: a stage 301, a stage 302, a stage 303, and a stage 304. In the stage 301, the video frame 202 is provided (as part of the video stream 202a) to a feature extraction function 400, which is illustrated and described in further detail in relation to FIG. 4.

The feature extraction function 400 outputs an aircraft keypoint heatmap 312 containing a set of aircraft keypoints 314. A heatmap is a graphical representation of data that uses a system of color-coding to represent different values. Heatmap pixel values indicate, for each keypoint, the likelihood of a 3D object's keypoint being found at each pixel location of the image. In some examples, the keypoints are not represented as binary points, but rather as probabilistic distributions. That is, each of the keypoints corresponds to a region of pixels, with the values of the pixels dropping according to a probability density function (pdf), with increasing distance from the center of the region. In some examples, the maximum value of a pixel, in a keypoint region of pixels, reflects a confidence level of that keypoint.

The set of aircraft keypoints 314 is provided to a correction and imputation 320 in the stage 302. The correction and imputation 320 produces an adjusted version of the set of aircraft keypoints 314 shown in an adjusted version of the aircraft keypoint heatmap 312a. For example, the correction and imputation 320 determines whether an aircraft keypoint is missing from the set of aircraft keypoints 314, and based on at least determining that an aircraft keypoint is missing, inserts an additional aircraft keypoint 322 into the aircraft keypoint heatmap 312.

The correction and imputation 320 also determines whether an aircraft keypoint 324 requires correction (e.g., is in the wrong position and should be moved), and based on at least determining that the aircraft keypoint 324 requires correction, correcting the aircraft keypoint 324. As illustrated, the aircraft keypoint 324 is shifted to the left in the aircraft keypoint heatmap 312. In some examples, the correction and imputation 320 uses a machine learning (ML) component, such as a Neural Network (NN) to recognize when aircraft keypoint are missing or require correction. Aircraft keypoints may be missing due to obscuration by portions of the aircraft 110, due to the viewing angle of the aircraft 110 by the camera 108, or due to other poor visibility conditions. Aircraft keypoints may be shifted (e.g., require correction), due to glare, bright reflections from the aircraft 110, or other perturbations to the view of the camera 108 that are manifest in the video frame 202.

The stage 303 uses a filter 330 to performing temporal filtering of the set of set of aircraft keypoints 314. In some examples, the temporal filtering comprises Kalman filtering that performs time-domain filtering across a time-series set of aircraft keypoint heatmaps 314a. Kalman filtering uses a series of measurements observed over time, containing statistical noise and other inaccuracies, and produces estimates of unknown variables that tend to be more accurate than those based on a single measurement alone, by estimating a joint probability distribution over the variables for each timeframe. In some examples, the filter 330 operates across video frames (e.g., the video frame 202 and the plurality of additional video frames 202b). In some examples, a threshold is applied to eliminate aircraft keypoints having a low confidence level.

In some examples, the filter 330 also fuses proximity sensor measurements 334 of the aircraft 110, received from the proximity sensor 109, with the set of aircraft keypoints 314. In such examples, determining the fuel receptacle position 230 on the aircraft 110 comprises fusing the proximity sensor measurements 334 of the aircraft 110 with the set of aircraft keypoints 314. To accomplish this, in some examples, the filter 330 uses a trained network (e.g., an NN) to incorporate the proximity information into the filtering process.

The adjusted and filtered aircraft keypoint heatmap 312 is provided to an aircraft 2D to 3D transform 340. In some examples, the aircraft 2D to 3D transform 340 uses a perspective-n-point (PnP) algorithm. PnP algorithms estimate the pose of a calibrated camera relative to an object, given a set of N 3D points on the object and their corresponding 2D projections in an image collected by the camera. The PnP algorithm used leverages the correspondences between the 2D pixel locations of detected keypoints and 3D keypoint locations on an object model to rotate and position the object in space such that the camera's view of the 3D keypoints matches the 2D pixel locations.

The aircraft 2D to 3D transform 340 determines the aircraft position 232 of the aircraft 110 and, from that, the fuel receptacle position 230. That is, once the aircraft position 232 is known, the fuel receptacle position 230, which is in a predetermined location on the aircraft 110, can be determined using a refine algorithm 342 that uses the known position of the fuel receptacle 116 on the aircraft 110. In some examples, the fuel receptacle position 230 is filtered with a temporal filter (which may be a Kalman filter). In some examples, the aircraft 2D to 3D transform 340 also generates the aircraft model projection 502 that is used by the video compilation 240. The aircraft model projection 332 is determined by rendering a 3D aircraft model according to the aircraft position 232.

The feature extraction function 400 and the correction and imputation 320 are both initially trained offline, although some examples may employ on-going training during deployment. In some examples, the training uses approximately 20,000 labeled training images, generated by sweeping across ranges of 6DoF variations for a 3D aircraft model 346. To increase variations in the datasets used for NN training, data augmentations may be randomly applied to each image passed to the NN. These augmentations include: brightness scaling, contrast scaling, image size scaling, and image translation, among others. Such augmentations may result in dropped and/or displaced keypoints that are beneficial for training the correction and imputation 320.

Figure 4:
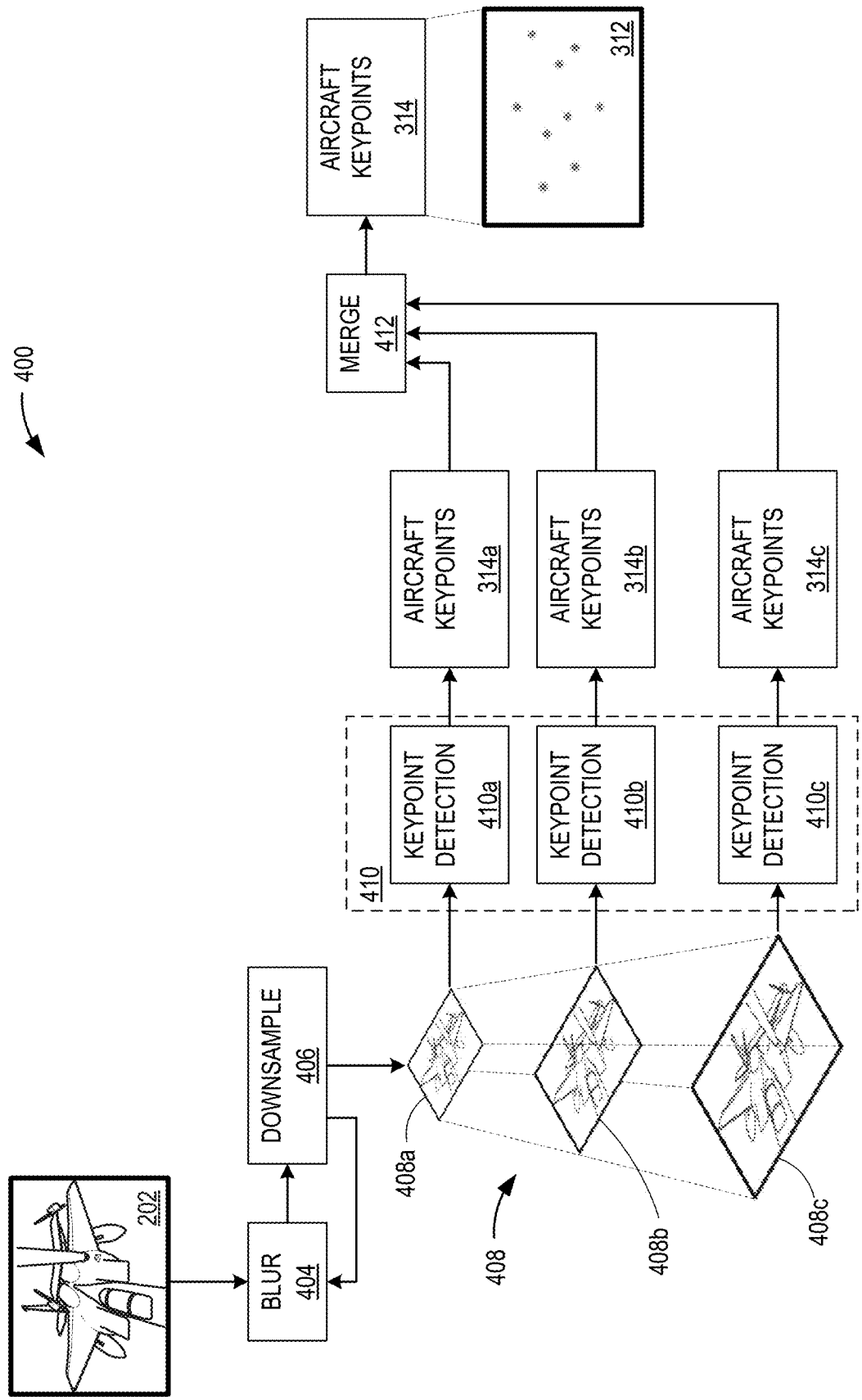
FIG. 4 illustrates a block diagram of a feature extraction function 400 in the aircraft position estimation pipeline 300 of FIG. 3, in accordance with an example.

FIG. 4 illustrates further detail for the feature extraction function 400. The video frame 202 is iteratively blurred by a blur function 404 and downsampled by a downsampling 406 to generate a plurality of images 408 having differing decreasing resolutions. That is, the plurality of images 408 comprises multiple reduced-resolution images, each iteration resulting in a lower resolution. In some examples, image 408*a* has half the resolution of image 408*b*, which has half the resolution of image 408*c*. This results in a pyramid representation (e.g., a plurality of images 408 comprises a pyramid representation), which may be a Gaussian pyramid representation. In some examples, a different downsampling rate may be used, including non-integer reduction ratios. In some examples, a different number of downsampled images may be used.

A pyramid representation, is a type of multi-scale signal representation in which a signal or an image is subject to repeated smoothing and subsampling. A low pass pyramid is made by smoothing the image with an appropriate smoothing filter and then subsampling the smoothed image, often by a factor of 2 along each coordinate direction. The resulting image is then subjected to the same procedure, and the cycle is repeated multiple times. Each cycle of this process results in a smaller image with increased smoothing, but with decreased spatial sampling density (e.g., decreased image resolution).

When illustrated graphically, with each cycle's resulting smaller image stacked one atop the other, the multi-scale representation appears in the shape of a pyramid. In a Gaussian pyramid, subsequent images are weighted down using a Gaussian average (e.g., a Gaussian blur is used in the blur function 404) and scaled down. Each pixel containing a local average corresponds to a neighborhood pixel on a lower level of the pyramid. In some examples, the video frame 202 is cropped to an aircraft bounding box, surrounding the aircraft 110, prior to the generation of the plurality of images 408, to exclude unnecessary sections of the video frame 202 from the keypoint detection process. This decreases computational time and allows the use of more computationally intensive algorithms.

A keypoint detector 410 detects, within each of the plurality of images 408, the set of aircraft keypoints 314 for the aircraft 110. This is illustrated as the keypoint detector 410 comprising a keypoint detector 410*a* that detects a set of aircraft keypoints 314*a* for the image 408*a*, a keypoint detector 410*b* that detects a set of aircraft keypoints 314*b* for the image 408*b*, and a keypoint detector 410*c* that detects a set of aircraft keypoints 314*c* for the image 408*c*. The keypoint detector 410 may be implemented using one or more NNs, such as CNNs, and in some examples, with a ResNet. Although the keypoint detector 410 is illustrated as comprising one keypoint detection function for each image, it should be understood that some NNs may perform keypoint detection on multiple images simultaneously.

The separate sets of aircraft keypoints 314*a*, 314*b*, and 314*c* are merged, by a merge function 412, into a merged (composite) set of aircraft keypoints, which becomes the set of aircraft keypoints 314. (That is, the set of aircraft keypoints 314 is a set of merged aircraft keypoints). One of the benefits of this approach is improved accuracy. In some scenarios, when an NN is trained on only a full-scale, high resolution image, the NN learns specific details of features rather than general attributes. Then, if these specific features are not present in use of the NN (e.g., during deployment), because of less-than-ideal image collection situations (e.g., glare, blur, flashed and bright reflections of sunlight), the NN underperforms because it is unable to locate the features it learned. However, by degrading the image via downsampling, the higher frequency content containing these specific feature details is lost, forcing the NN to learn the features more generally. Merging results from NNs (e.g., CNNs or even other types of networks), that had been trained with a set of reduced-resolutions images (even if accomplished prior to time-domain filtering) may significantly improve keypoint detection (e.g., feature extraction) performance.

FIG. 5 illustrates a video frame 500, in which the aircraft model projection 502 is overlaid onto the video frame 202, over the aircraft 110 (not seen here, because of the overlay) for display to the human operator 242. The aircraft model projection 502 is generated using a 3D aircraft model (e.g., a computer-aided design (CAD) model), rendered according to the aircraft position 232. In some examples, a boom model projection (based on a boom model 662 of FIG. 6) is overlaid onto the video frame 202 in addition to or instead of the aircraft model projection 502. For reference, the set of aircraft keypoints 314 is also shown in FIG. 5, which may or may not be shown to the human operator 242.

Figure 6:
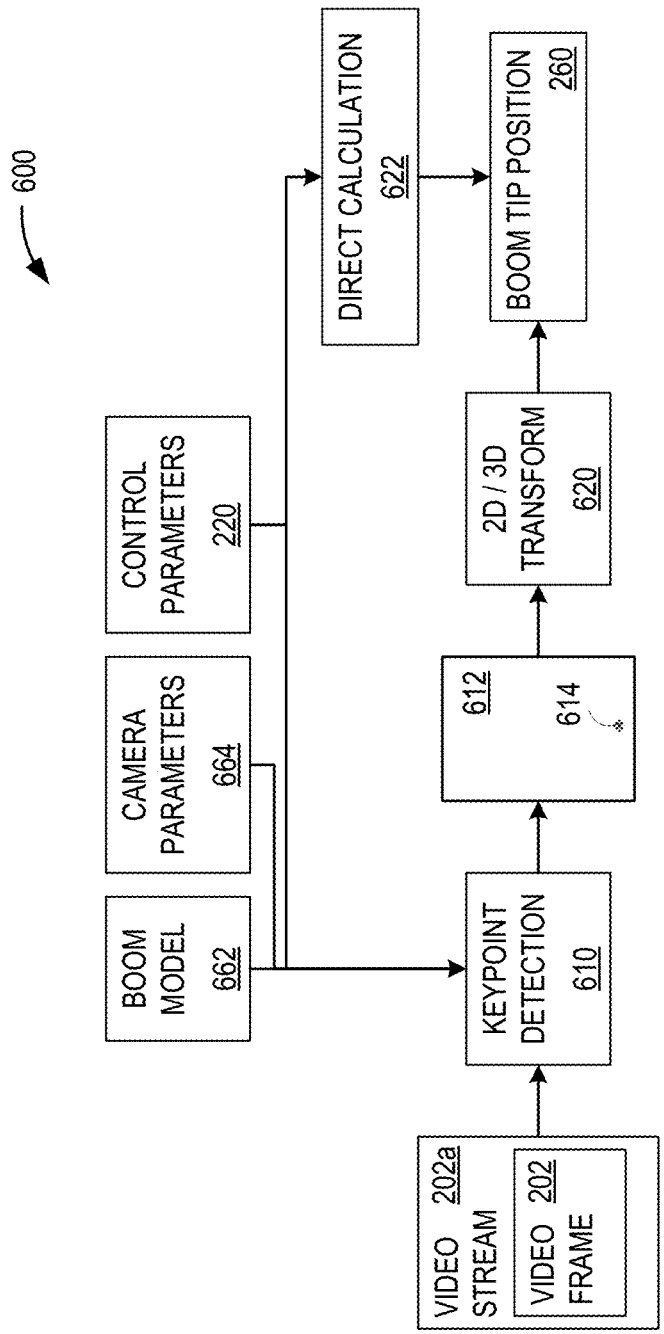
FIG. 6 illustrates a block diagram of a boom tip position estimation pipeline 600 in the CV architecture 200 of FIG. 2, in accordance with an example.

FIG. 6 illustrates further detail for the boom tip position estimation pipeline 600 in the CV architecture 200 of FIG. 2. Different classes of operations are possible with the illustrated boom tip position estimation pipeline 600. In one class of operation, the boom model 662, the camera parameters 664 (e.g., extrinsic and intrinsic parameters for the camera 108), and the boom control parameters 220 are input into a direct calculation 622 to calculate the boom tip position 260, from the physical geometry of the aerial refueling boom 104 and the refueling platform 102, rather than determining the boom tip position 260 from the video stream 202*a*. In some examples, the boom model 662 comprises a CAD model of the aerial refueling boom 104.

Calculation of the boom tip position 260, from the physical geometry of the aerial refueling boom 104 uses the known angles, extrinsics, and geometry of the aerial refueling boom 104 in relation to the camera 108 to determine a projection of the aerial refueling boom 104. The pipeline 600 monitors each video frame 202 from the stream 202*a* and determines the pitch and roll states of the boom control 222, the pitch and roll of the aerial refueling boom 104 in relation to the camera 108. The intrinsics of the camera 108 and its position on the refueling platform 102 are known, enabling determination of the location of the aerial refueling boom 104 in the 2D pixel space of the camera 108.

Camera parameter information includes the parameters used in a camera model to describe the mathematical relationship between the 3D coordinates of a point in the scene from which the light comes from and the 2D coordinates of its projection onto the image plane. Intrinsic parameters, also known as internal parameters, are the parameters intrinsic to the camera itself, such as the focal length and lens distortion. Extrinsic parameters, also known as external parameters or camera pose, are the parameters used to describe the transformation between the camera and its external world. The camera extrinsic information, resolution, magnification, and other intrinsic information are known.

In an alternative operation, the video stream 202a (including the video frame 202) is input into a boom tip keypoint detector 610 (which may also make use of the boom model 662, the camera parameters 664, and the boom control parameters 220 for enhanced accuracy), which produces a boom tip keypoint heatmap 612. In some examples, the boom tip keypoint detector 610 comprises an NN, for example a CNN (e.g., a ResNet or other type of network). In some examples, the video frame 202 is cropped to the boom tip bounding box 120 prior to being input into the boom tip keypoint detector 610. The boom tip keypoint heatmap 612 has the boom tip keypoint 614, as detected in the video frame 202. In some examples, the boom tip keypoint 614 is time-domain filtered (e.g., with a Kalman filter or other type of temporal filter) across video frames (e.g., the video frame 202 and the plurality of additional video frames 200b). in some examples, the video frame 202 is converted into a pyramid representation, the boom tip keypoint 614 is found at each resolution, and the different resolution results are merged, similarly as described for the feature extraction function 400.

The boom tip keypoint heatmap 612 is provided to a boom tip 2D to 3D transform 620, which determines the boom tip position 260. In some examples, the boom tip position 260 is filtered (e.g., with a Kalman filter or other type of temporal filter). In some examples, the boom tip 2D to 3D transform 620 also generates a boom model projection for use by the video compilation 240 (of FIG. 2) to produce an overlay in the video frame 500. The boom tip keypoint detector 610 is initially trained offline, although some examples may employ on-going training during deployment.

Figure 7:
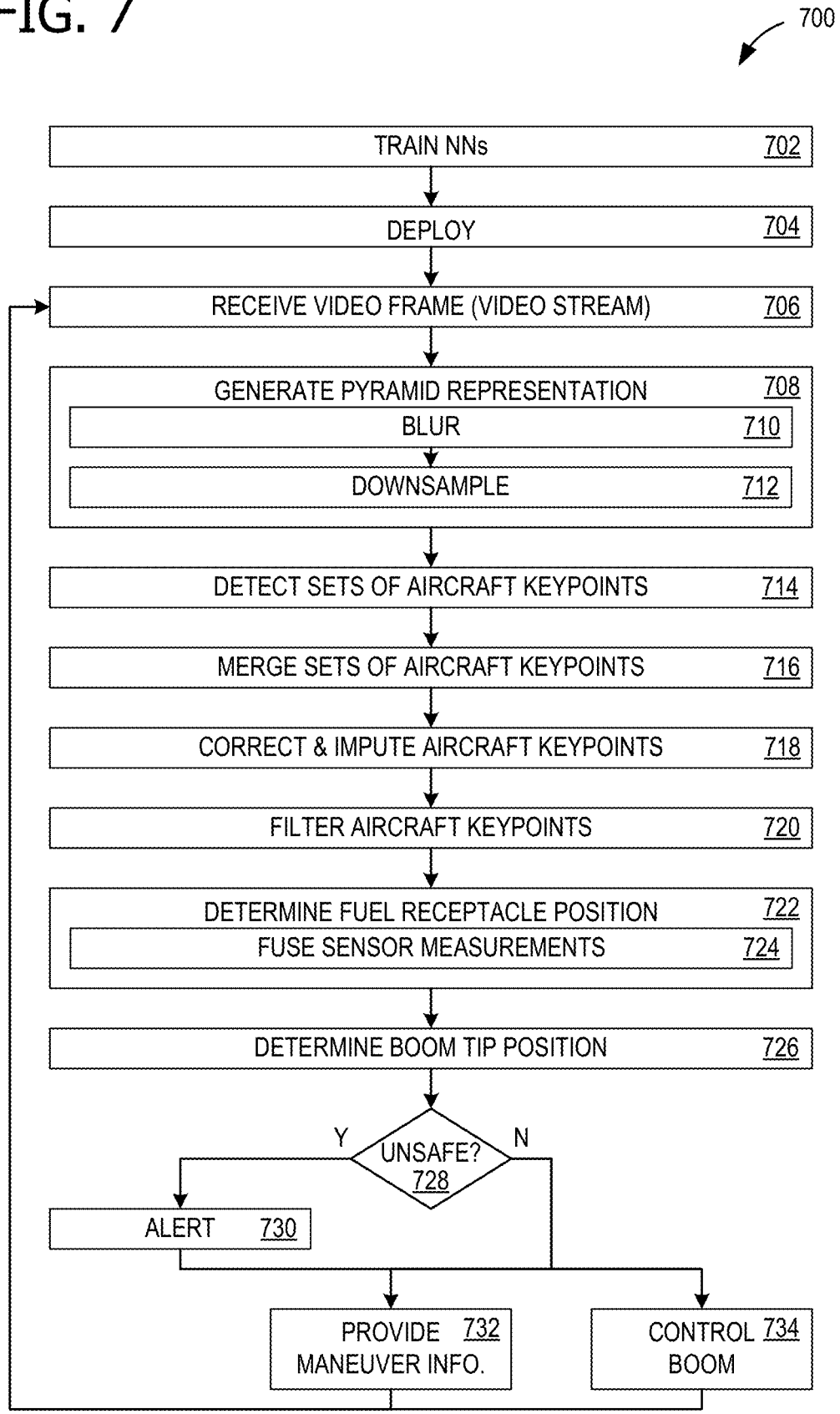
FIG. 7 is a flowchart 700 illustrating a method of feature detection for A3R, as can be used with the arrangement 100 of FIG. 1, in accordance with an example.

With reference now to FIG. 7, a flowchart 700 illustrates a method of air-to-air refueling (e.g., A3R or human-assisted air-to-air refueling) which may be used with the arrangement 100 of FIG. 1. In some examples, the operations illustrated in FIG. 7 are performed, at least in part, by executing instructions 902a (stored in the memory 902) by the one or more processors 904 of the computing device 900 of FIG. 9. For example, any of the feature extraction function 400, the correction and imputation 320, the filter 330, the aircraft 2D to 3D transform 340, the keypoint detector 410 (including the keypoint detectors 410a, 410b, and 410c), the boom tip keypoint detector 610, and any other ML component of the CV architecture 200 may be trained on a first example of the computing device 900 and then deployed on a second (different) example of the computing device 900.

Operation 702 includes training any networks any other ML components of the CV architecture 200. In some examples, operation 702 is performed prior to deployment 704, although in some examples, operation 702 remains ongoing during operational use of the CV architecture 200. In some examples, operation 702 includes training an NN with a plurality of labeled images of a scene, the plurality of labeled images having differing decreasing resolutions of a common scene (e.g., similar to the plurality of images 408). In some examples, operation 702 includes training an NN to insert an additional aircraft keypoint into a heatmap. Operation 706 includes receiving the video frame 202. In some examples, the video frame 202 is provided by a single camera (e.g., the camera 108). In some examples, the video frame 202 is monocular. Some examples include receiving the video stream 202a comprising the video frame 202 and the plurality of additional video frames 202b.

Operation 708 includes generating, from the video frame 202, the plurality of images 408 having differing decreasing resolutions. In some examples, the plurality of images 408 having differing decreasing resolutions comprises a pyramid representation. In some examples, the plurality of images 408 having differing decreasing resolutions comprises a Gaussian pyramid representation. Operation 708 includes a blur operation 710 and a downsample operation 712 that are iterated to generate the pyramid representation (e.g., the plurality of images 408). In some examples, generating the plurality of images 408 having differing decreasing resolutions comprises blurring the video frame 202 and downsampling the blurred video frame. In some examples, generating the plurality of images 408 having differing decreasing resolutions comprises iteratively blurring the video frame 202 and downsampling to produce a set of multiple reduced-resolution images 408a-408c, each iteration resulting in a lower resolution. In some examples, the blurring uses a Gaussian profile.

Operation 714 includes detecting, within each of the plurality of images 408, the sets of aircraft keypoints 314a-314c for the aircraft 110 to be refueled. Operation 716 includes merging the sets of aircraft keypoints 314a-314c into the set of merged aircraft keypoints 314. Operation 718 includes determining whether a merged aircraft keypoint is missing and, based on at least determining that the merged aircraft keypoint is missing, inserting (imputing) an additional aircraft keypoint (e.g., the additional aircraft keypoint 322) into the aircraft keypoint heatmap 312. Operation 718 further includes determining whether a merged aircraft keypoint requires correction and, based on at least determining that the merged aircraft keypoint 324 requires correction, correcting the merged aircraft keypoint 324. Operation 720 includes performing temporal filtering of the aircraft keypoints 314. In some examples, performing temporal filtering comprises performing Kalman filtering.

Operation 722 includes, based on at least the merged aircraft keypoints 314, determining a position of the fuel receptacle 116 on the aircraft 110. In some examples, determining the position of the fuel receptacle 116 on the aircraft 110 comprises determining the position of the fuel receptacle 116 with 6DoF. In some examples, determining the position of the fuel receptacle 116 on the aircraft 110 comprises determining the position of the aircraft 110. In some examples, determining the position of the fuel receptacle 116 on the aircraft 110 comprises determining the position of the fuel receptacle 116 using a PnP algorithm. In some examples, determining the position of the fuel receptacle 116 on the aircraft 110 comprises determining the position of the fuel receptacle 116 using a NN. Some examples include operation 724, which involves fusing the proximity sensor measurements 334 of the aircraft 110 with the merged aircraft keypoints 314. In some examples, the proximity sensor measurements comprise lidar measurements or radar measurements. In some examples, determining the position of the fuel receptacle 116 on the aircraft 110 comprises fusing the proximity sensor measurements 334 of the aircraft 110 with the merged aircraft keypoints 314.

Operation 726 includes determining a position of the boom tip 106 (e.g., the boom tip position 260) of the aerial refueling boom 104. In some examples, determining the boom tip position 260 (e.g., the position of the boom tip 106) of the aerial refueling boom 104 comprises detecting, within the video frame 202, the boom tip keypoint 614.

A decision operation 728 identifies an unsafe condition. Decision operation 728 includes, based on at least the position of the fuel receptacle 116 and the boom tip position 260, determining whether controlling the aerial refueling boom 104 to engage the fuel receptacle 116 is within the safety parameters 214. If an unsafe condition exists, operation 730 includes, based on at least determining that controlling the aerial refueling boom 104 to engage the fuel receptacle 116 is not within the safety parameters 214, generating the alert 216. The aircraft 110 (e.g., a pilot of the aircraft 110, or the aircraft's autonomous flight control, if the aircraft 110 is a UAV) is provided with the maneuvering information 218, in operation 732, for example to avoid a damaging collision of the aircraft 110 with the aerial refueling boom 104. Operation 732 includes providing, to the aircraft 110, maneuvering information to facilitate engaging the fuel receptacle 116 with the aerial refueling boom 104.

Operation 732 may also occur even when there is no unsafe condition, in some examples. Operation 734 includes, based on at least the position of the fuel receptacle 116 and the position of the boom tip, controlling the aerial refueling boom 104 to engage the fuel receptacle 116. In some examples, controlling the aerial refueling boom 104 to engage the fuel receptacle 116 comprises tracking a distance between the boom tip 106 and the fuel receptacle 116. In some examples, controlling the aerial refueling boom 104 to engage the fuel receptacle 116 comprises determining the boom control parameters 220 to close the distance between the boom tip 106 and the fuel receptacle 116. In situations in which there is unsafe condition, operation 734 may instead include controlling the aerial refueling boom 104 to avoid damaging the aircraft 110. The flowchart 700 returns to operation 706 for the next video frame 202 of the video stream 202a.

Figure 8:
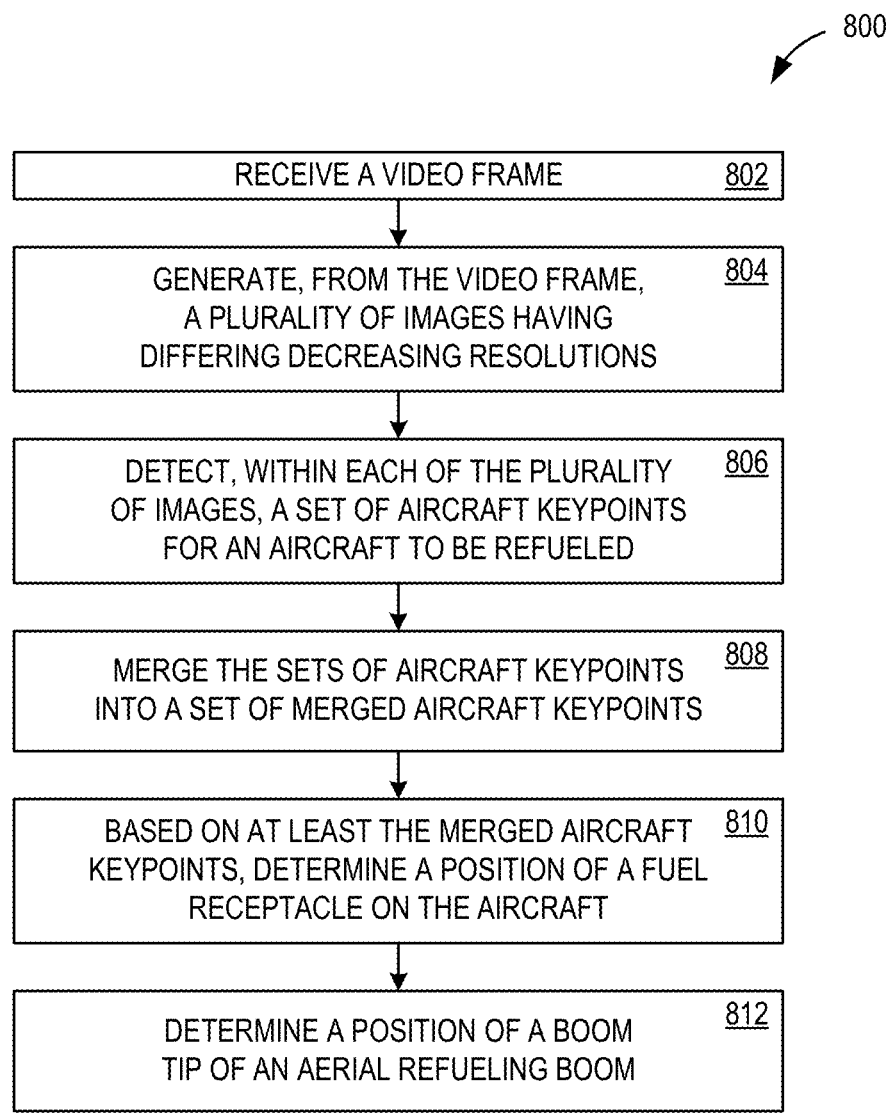
FIG. 8 is a flowchart 800 illustrating another method of feature detection for A3R, as can be used with the arrangement 100 of FIG. 1, in accordance with an example.

FIG. 8 shows a flowchart 800 illustrating a method of air-to-air refueling according to the disclosure. In some examples, operations illustrated in FIG. 8 are performed, at least in part, by executing instructions by the one or more processors 904 of the computing device 900 of FIG. 9. Operation 802 includes receiving a video frame. Operation 804 includes generating, from the video frame, a plurality of images having differing decreasing resolutions. Operation 806 includes detecting, within each of the plurality of images, a set of aircraft keypoints for an aircraft to be refueled. Operation 808 includes merging the sets of aircraft keypoints into a set of merged aircraft keypoints. Operation 810 includes based on at least the merged aircraft keypoints, determining a position of a fuel receptacle on the aircraft. Operation 812 includes determining a position of a boom tip of an aerial refueling boom.

Figure 9:
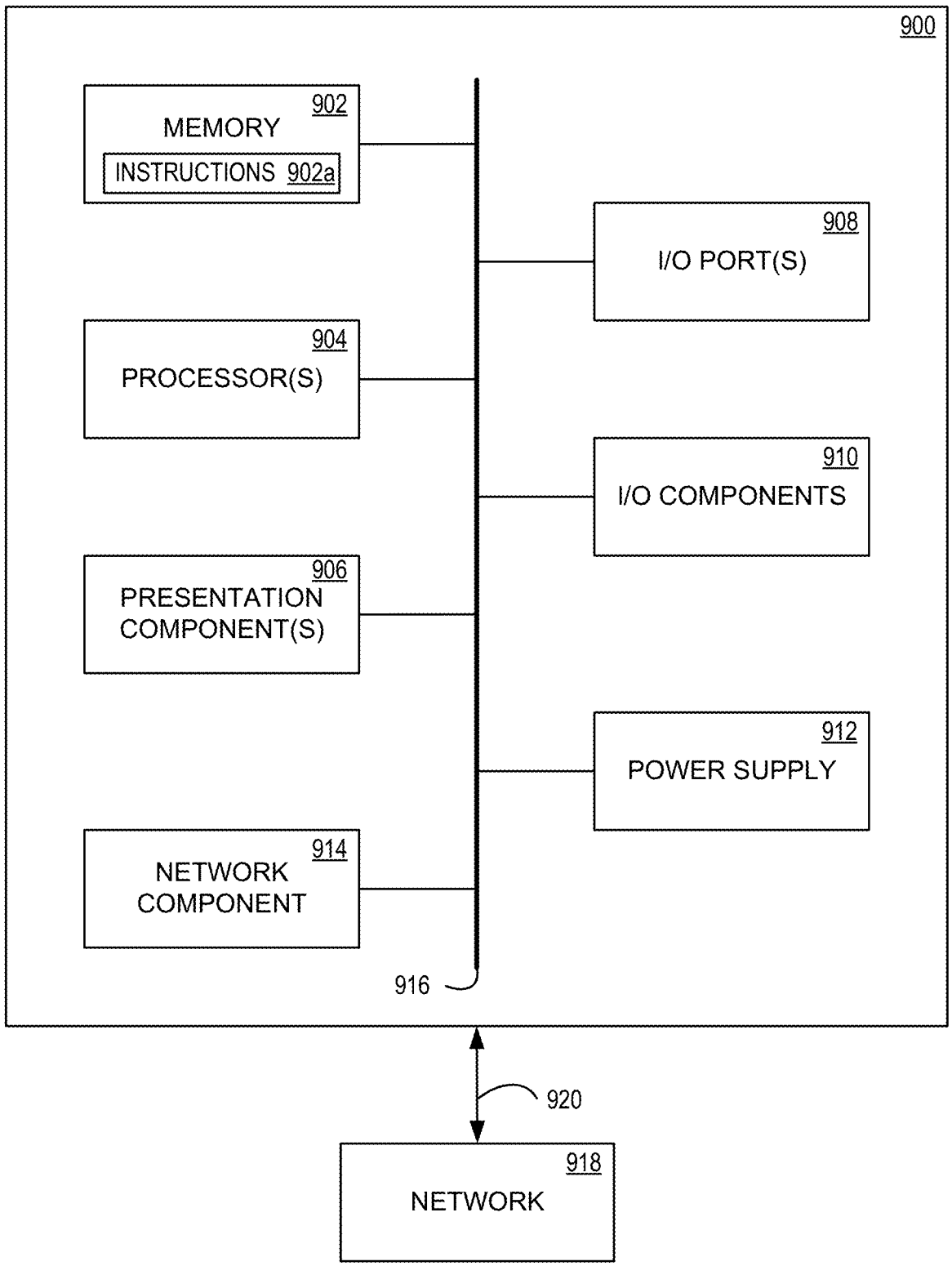
FIG. 9 is a block diagram of a computing device 900 suitable for implementing various aspects of the disclosure in accordance with an example.

With reference now to FIG. 9, a block diagram of the computing device 900 suitable for implementing various aspects of the disclosure is described. In some examples, the computing device 900 includes one or more processors 904, one or more presentation components 906 and the memory 902. In some embodiments, one or more of the components may be combined or separated. For example, in some embodiments, the memory 902 may be integrated or part of the processor 904. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 9 and the references herein to a "computing device." The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902a configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flowcharts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways. In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Implementations of the I/O components 910 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some implementations blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 10:
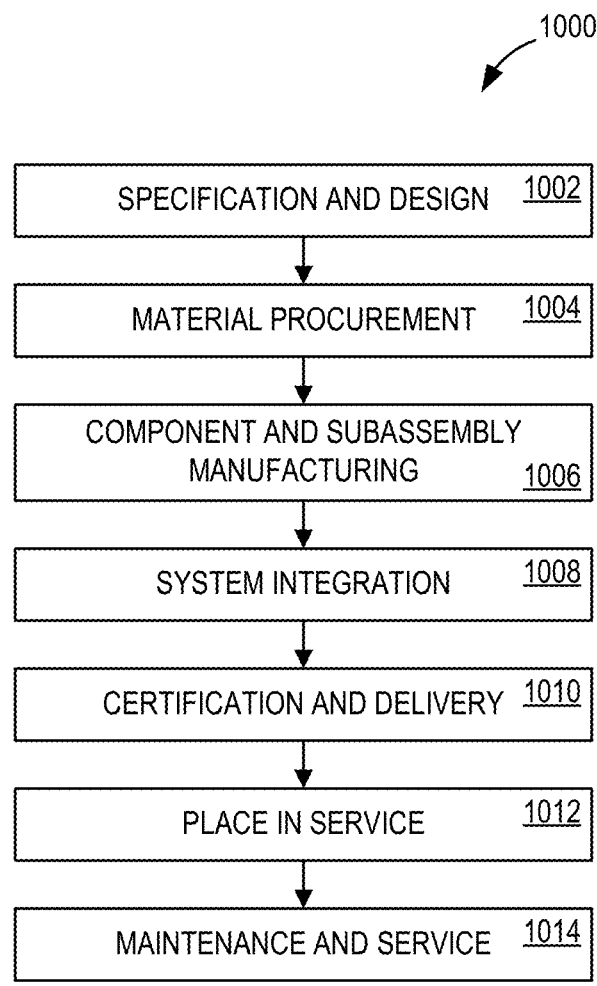
FIG. 10 is a block diagram of an apparatus production and service method 1000 that employs various aspects of the disclosure in accordance with an example.
Figure 11:
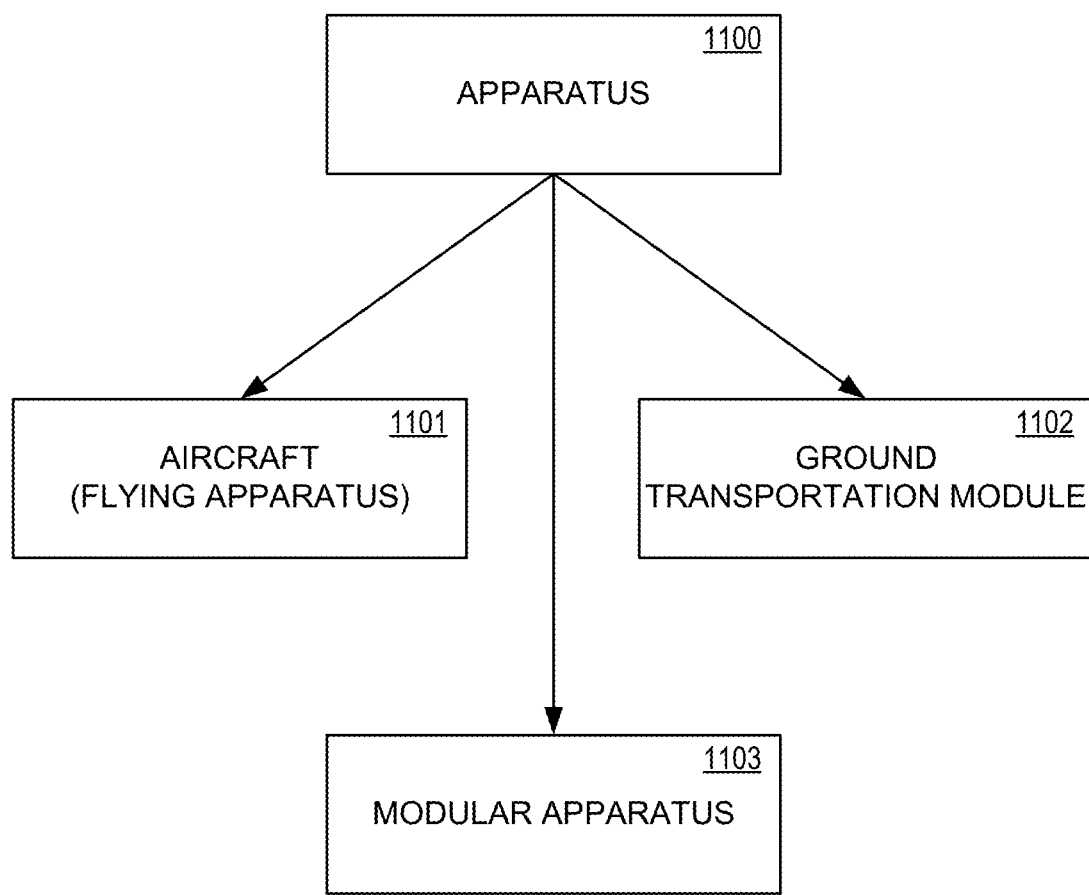
FIG. 11 is a block diagram of an apparatus 1100 for which various aspects of the disclosure may be advantageously employed in accordance with an example.
Figure 12:
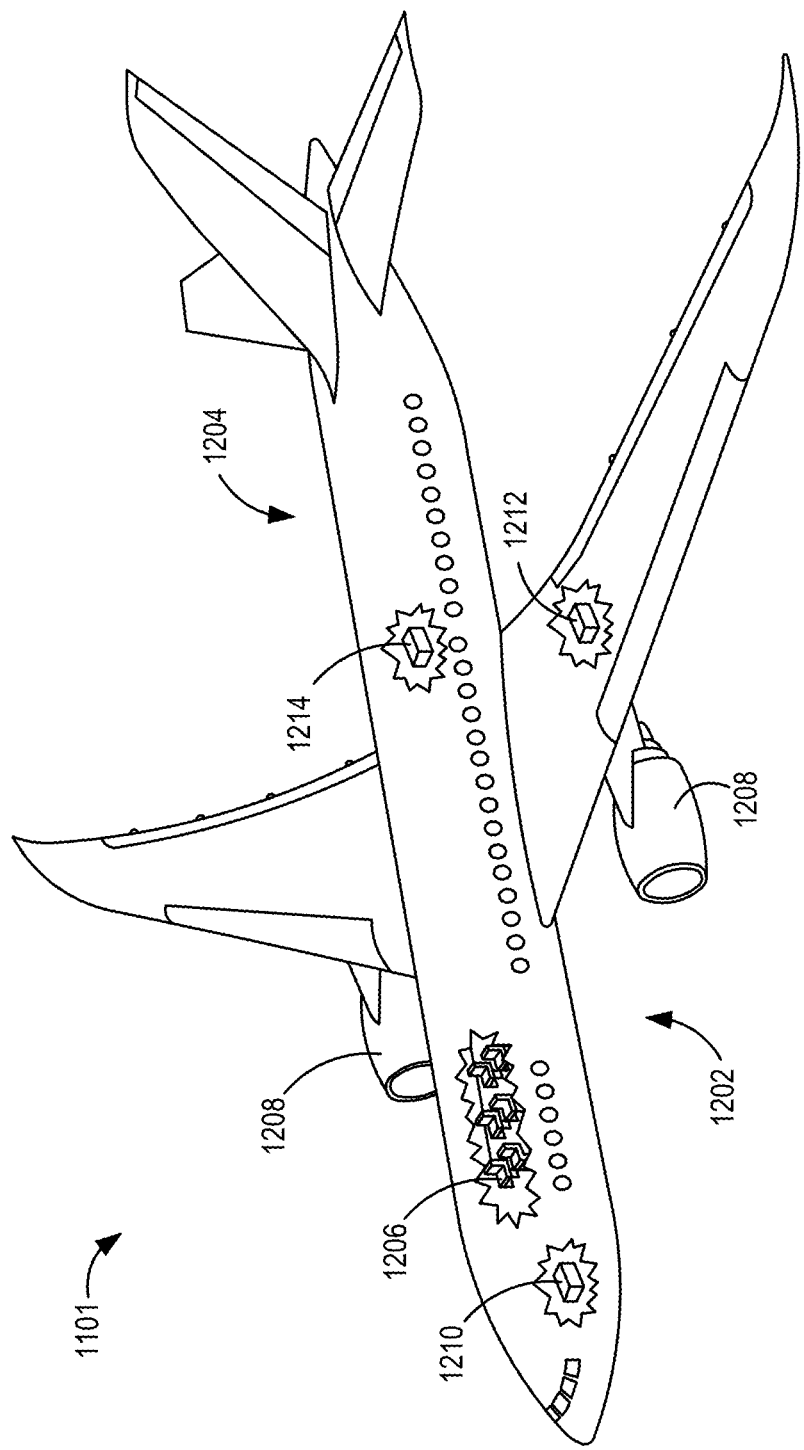
FIG. 12 is a schematic perspective view of a particular flying apparatus 1101 in accordance with an example.

Some examples of the disclosure are used in manufacturing and service applications as shown and described in relation to FIGS. 10-12. Examples of the disclosure are described in the context of an apparatus of manufacturing and service method 1000 shown in FIG. 10 and apparatus 1100 shown in FIG. 11. In FIG. 11, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1104. During production, component, and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein.

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, air cargo, flying car, satellite, planetary probe, deep space probe, solar probe, and the like. As also shown in FIG. 11, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 11 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 12, a more specific diagram of the flying apparatus 1101 is depicted in which an implementation of the disclosure is advantageously employed. In this example, the flying apparatus 1101 is an aircraft produced by the apparatus manufacturing and service method 1000 in FIG. 10 and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of air-to-air refueling comprises: receiving a video frame; generating, from the video frame, a plurality of images having differing decreasing resolutions; detecting, within each of the plurality of images, a set of aircraft keypoints for an aircraft to be refueled; merging the sets of aircraft keypoints into a set of merged aircraft keypoints; based on at least the merged aircraft keypoints, determining a position of a fuel receptacle on the aircraft; and determining a position of a boom tip of an aerial refueling boom.

An example system for air-to-air refueling comprises: one or more processors; and a memory storing instructions that, when executed by the one or more processors, cause the one or more processors to perform operations comprising: receiving a video frame; generating, from the video frame, a plurality of images having differing decreasing resolutions; detecting, within each of the plurality of images, a set of aircraft keypoints for an aircraft to be refueled; merging the sets of aircraft keypoints into a set of merged aircraft keypoints; based on at least the merged aircraft keypoints, determining a position of a fuel receptacle on the aircraft; and determining a position of a boom tip of an aerial refueling boom.

An example computer program product comprises a computer usable medium having a computer readable program code embodied therein, the computer readable program code adapted to be executed to implement a method of air-to-air refueling, the method comprises: receiving a video frame; generating, from the video frame, a plurality of images having differing decreasing resolutions; detecting, within each of the plurality of images, a set of aircraft keypoints for an aircraft to be refueled; merging the sets of aircraft keypoints into a set of merged aircraft keypoints; based on at least the merged aircraft keypoints, determining a position of a fuel receptacle on the aircraft; and determining a position of a boom tip of an aerial refueling boom.

Alternatively, or in addition to the other examples described herein, examples include any combination of the following:

the video frame is provided by a single camera;

the video frame is monocular;

a camera;

receiving a video stream comprising the video frame and a plurality of additional video frames;

the plurality of images having differing decreasing resolutions comprises a pyramid representation;

the plurality of images having differing decreasing resolutions comprises a Gaussian pyramid representation;

generating the plurality of images having differing decreasing resolutions comprises blurring the video frame and downsampling the blurred video frame;

generating the plurality of images having differing decreasing resolutions comprises iteratively blurring the video frame and downsampling to produce a set of multiple reduced-resolution images, each iteration resulting in a lower resolution;

the blurring uses a Gaussian profile;

performing temporal filtering of aircraft keypoints;

performing temporal filtering comprises performing Kalman filtering;

determining whether a merged aircraft keypoint is missing;

based on at least determining that the merged aircraft keypoint is missing, inserting an additional aircraft keypoint into an aircraft keypoint heatmap;

determining whether a merged aircraft keypoint requires correction;

based on at least determining that the merged aircraft keypoint requires correction, correcting the merged aircraft keypoint;

determining the position of the fuel receptacle on the aircraft comprises determining the position of the fuel receptacle with six degrees of freedom (6DoF);

determining the position of the fuel receptacle on the aircraft comprises determining the position of the aircraft;

determining the position of the fuel receptacle on the aircraft comprises determining the position of the fuel receptacle using a position and pose (PnP) algorithm;

determining the position of the fuel receptacle on the aircraft comprises determining the position of the fuel receptacle using an NN;

determining the position of the boom tip of the aerial refueling boom comprises detecting, within the video frame 202, a boom tip keypoint;

a proximity sensor;

determining the position of the fuel receptacle on the aircraft comprises fusing proximity sensor measurements of the aircraft with the merged aircraft keypoints;

the proximity sensor measurements comprise lidar measurements or radar measurements;
based on at least the position of the fuel receptacle and the position of the boom tip, determining whether controlling the aerial refueling boom to engage the fuel receptacle is within safety parameters;
based on at least determining that controlling the aerial refueling boom to engage the fuel receptacle is not within safety parameters, generating an alert;
controlling the aerial refueling boom to engage the fuel receptacle comprises tracking a distance between the boom tip and the fuel receptacle;
controlling the aerial refueling boom to engage the fuel receptacle comprises determining boom control parameters to close the distance between the boom tip and the fuel receptacle;
controlling the aerial refueling boom to avoid damaging the aircraft;
a boom control that controls the aerial refueling boom to engage the fuel receptacle;
providing, to the aircraft, maneuvering information to facilitate engaging the fuel receptacle with the aerial refueling boom;
training an NN with a plurality of labeled images of a scene, the plurality of labeled images having differing decreasing resolutions of a common scene; and
training an NN to insert an additional aircraft keypoint into an aircraft keypoint heatmap.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of air-to-air refueling, the method comprising:
receiving a video frame;
generating, from the video frame, a first plurality of images having differing decreasing resolutions;
detecting, within each of the first plurality of images, a set of aircraft keypoints for an aircraft to be refueled;
merging the sets of aircraft keypoints into a set of merged aircraft keypoints;
determining whether a merged aircraft keypoint requires correction;
based on at least determining that the merged aircraft keypoint requires correction, shifting a position of the merged aircraft keypoint in an aircraft keypoint heatmap;
based on at least the merged aircraft keypoints, determining a position of a fuel receptacle on the aircraft;
cropping the video frame to a video region containing a boom tip of an aerial refueling boom;
generating, from the video region, a second plurality of images having differing decreasing resolutions;
detecting, within each of the second plurality of images, a boom tip keypoint for the boom tip;
merging the boom tip keypoints into a set of merged boom tip keypoints; and
based on the merged boom tip keypoints, determining a position of the boom tip.

2. The method of claim 1, further comprising:
based on at least the position of the fuel receptacle and the position of the boom tip, controlling the aerial refueling boom to engage the fuel receptacle.

3. The method of claim 1, wherein the video frame is provided by a single camera.

4. The method of claim 1, further comprising:
providing, to the aircraft, maneuvering information to facilitate engaging the fuel receptacle with the aerial refueling boom.

5. The method of claim 1, further comprising:
based on at least the position of the fuel receptacle and the position of the boom tip, determining whether controlling the aerial refueling boom to engage the fuel receptacle is within safety parameters; and
based on at least determining that controlling the aerial refueling boom to engage the fuel receptacle is not within safety parameters, generating an alert.

6. The method of claim 1, further comprising:
determining whether a merged aircraft keypoint is missing; and
based on at least determining that the merged aircraft keypoint is missing, inserting an additional aircraft keypoint into the aircraft keypoint heatmap.

7. The method of claim 1, further comprising:
training a first neural network (NN) with a plurality of labeled images of a scene, the plurality of labeled images having differing decreasing resolutions of a common scene;
wherein detecting, within each of the first plurality of images, a set of aircraft keypoints is performed via an aircraft keypoint detector, wherein the aircraft keypoint detector comprises the first neural network; and
wherein detecting, within each of the second plurality of images, a boom tip keypoint is performed via a boom tip keypoint detector, wherein the boom tip keypoint detector comprises a second neural network.

8. The method of claim 1, further comprising:
performing temporal filtering of aircraft keypoints.

9. The method of claim 1, wherein determining the position of the fuel receptacle on the aircraft comprises:
fusing proximity sensor measurements of the aircraft with the merged aircraft keypoints.

10. A system for fuel receptacle and boom tip position and pose estimation for aerial refueling, the system comprising:
one or more processors; and
a memory storing instructions that, when executed by the one or more processors, cause the one or more processors to perform operations comprising:
receiving a video frame;
generating, from the video frame, a first plurality of images having differing decreasing resolutions;
detecting, within each of the first plurality of images, a set of aircraft keypoints for an aircraft to be refueled;
merging the sets of aircraft keypoints into a set of merged aircraft keypoints;
determining whether a merged aircraft keypoint requires correction;

based on at least determining that the merged aircraft keypoint requires correction, shifting a position of the merged aircraft keypoint in an aircraft keypoint heatmap;
based on at least the merged aircraft keypoints, determining a position of a fuel receptacle on the aircraft;
cropping the video frame to a video region containing a boom tip of an aerial refueling boom;
generating, from the video region, a second plurality of images having differing decreasing resolutions;
detecting, within each of the second plurality of images, a boom tip keypoint for the boom tip;
merging the boom tip keypoints into a set of merged boom tip keypoints; and
based on the merged boom tip keypoints, determining a position of the boom tip.

11. The system of claim 10, further comprising:
a boom control that controls the aerial refueling boom to engage the fuel receptacle, based on at least the position of the fuel receptacle and the position of the boom tip.

12. The system of claim 10, further comprising:
a camera, wherein the video frame is provided by the camera; and
a proximity sensor, wherein determining the position of the fuel receptacle on the aircraft comprises:
fusing proximity sensor measurements of the aircraft with the merged aircraft keypoints.

13. The system of claim 10, wherein the operations further comprise:
providing, to the aircraft, maneuvering information to facilitate engaging the fuel receptacle with the aerial refueling boom.

14. The system of claim 10, further comprising:
performing temporal filtering of aircraft keypoints.

15. The system of claim 10, wherein the operations further comprise:
training a first neural network (NN) with a plurality of labeled images of a scene, the plurality of labeled images having differing decreasing resolutions of a common scene;
wherein detecting, within each of the first plurality of images, a set of aircraft keypoints is performed via an aircraft keypoint detector, wherein the aircraft keypoint detector comprises the first neural network; and
wherein detecting, within each of the second plurality of images, a boom tip keypoint is performed via a boom tip keypoint detector, wherein the boom tip keypoint detector comprises a second neural network.

16. A computer program product, comprising a non-transitory computer usable medium having a computer readable program code embodied therein, the computer readable program code adapted to be executed to implement a method of air-to-air refueling, the method comprising:
receiving a video frame;
generating, from the video frame, a first plurality of images having differing decreasing resolutions;
detecting, within each of the first plurality of images, a set of aircraft keypoints for an aircraft to be refueled;
merging the sets of aircraft keypoints into a set of merged aircraft keypoints;
determining whether a merged aircraft keypoint requires correction;
based on at least determining that the merged aircraft keypoint requires correction, shifting a position of the merged aircraft keypoint in an aircraft keypoint heatmap;
based on at least the merged aircraft keypoints, determining a position of a fuel receptacle on the aircraft;
cropping the video frame to a video region containing a boom tip of an aerial refueling boom;
generating, from the video region, a second plurality of images having differing decreasing resolutions;
detecting, within each of the second plurality of images, a boom tip keypoint for the boom tip;
merging the boom tip keypoints into a set of merged boom tip keypoints; and
based on the merged boom tip keypoints, determining a position of the boom tip.

17. The computer program product of claim 16, wherein the method further comprises:
based on at least the position of the fuel receptacle and the position of the boom tip, controlling the aerial refueling boom to engage the fuel receptacle.

18. The computer program product of claim 16, wherein the method further comprises:
based on at least the position of the fuel receptacle and the position of the boom tip, determining whether controlling the aerial refueling boom to engage the fuel receptacle is within safety parameters; and
based on at least determining that controlling the aerial refueling boom to engage the fuel receptacle is not within safety parameters, generating an alert.

19. The computer program product of claim 16, wherein the method further comprises:
training a first neural network (NN) with a plurality of labeled images of a scene, the plurality of labeled images having differing decreasing resolutions of a common scene;
wherein detecting, within each of the first plurality of images, a set of aircraft keypoints is performed via an aircraft keypoint detector, wherein the aircraft keypoint detector comprises the first neural network; and
wherein detecting, within each of the second plurality of images, a boom tip keypoint is performed via a boom tip keypoint detector, wherein the boom tip keypoint detector comprises a second neural network.

20. The computer program product of claim 16, wherein the method further comprises:
training a neural network (NN) to insert an additional aircraft keypoint into the aircraft keypoint heatmap.

* * * * *